US009075502B2

(12) United States Patent
Wattenberg et al.

(10) Patent No.: US 9,075,502 B2
(45) Date of Patent: *Jul. 7, 2015

(54) TECHNIQUES FOR GENERATING AND DISPLAYING A VISUAL FLOW OF USER CONTENT THROUGH A SOCIAL NETWORK

(71) Applicant: Google Inc., Mountain View, CA (US)

(72) Inventors: Martin Miles Wattenberg, Winchester, MA (US); Fernanda Bertini Viégas, Cambridge, MA (US); John Francis Hebert, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,092

(22) Filed: Apr. 28, 2014

(65) Prior Publication Data

US 2014/0237391 A1    Aug. 21, 2014

Related U.S. Application Data

(63) Continuation of application No. 13/279,796, filed on Oct. 24, 2011, now Pat. No. 8,713,455.

(51) Int. Cl.
| | |
|---|---|
| *G06F 3/0481* | (2013.01) |
| *G06F 15/16* | (2006.01) |
| *G06Q 50/00* | (2012.01) |
| *H04L 12/58* | (2006.01) |

(52) U.S. Cl.
CPC .............. *G06F 3/0481* (2013.01); *G06Q 50/01* (2013.01); *H04L 12/588* (2013.01)

(58) Field of Classification Search
CPC ......... G06F 3/00; G06F 3/048; G06F 3/0481; G06F 3/0482; G06F 9/44543; H04L 29/06; G06Q 50/01; G06Q 10/10; G06Q 30/02
USPC ......... 715/733, 751, 753, 764, 765, 810, 835, 715/853, 854; 705/319; 709/204
See application file for complete search history.

(56) References Cited

U.S. PATENT DOCUMENTS

| | | | |
|---|---|---|---|
| 8,228,821 B2 * | 7/2012 | Robinson et al. ............. | 370/254 |
| 2012/0290950 A1 | 11/2012 | Rapaport et al. | |
| 2013/0091021 A1 | 4/2013 | Maslov et al. | |
| 2013/0159412 A1 | 6/2013 | Robinson et al. | |
| 2013/0304818 A1 | 11/2013 | Brumleve et al. | |

OTHER PUBLICATIONS

PCT International Search Report and Written Opinion dated Dec. 3, 2014 for PCT International Application No. PCT/US2012/061474 (8 pages).

* cited by examiner

*Primary Examiner* — Xiomar L Bautista
(74) *Attorney, Agent, or Firm* — Remarck Law Group PLC

(57) ABSTRACT

A computer-implemented technique for generating a visual display illustrating the flow of user content in a social network is described. The technique can include determining a user content associated with a plurality of users. The technique can further include generating a visual display that includes a region for each user of the plurality of users. The technique can also include generating arranging the regions in the visual display according to a set of layout rules, and aligning a directional indicator in the visual display. The technique can include providing the visual display to a user via a display.

19 Claims, 6 Drawing Sheets

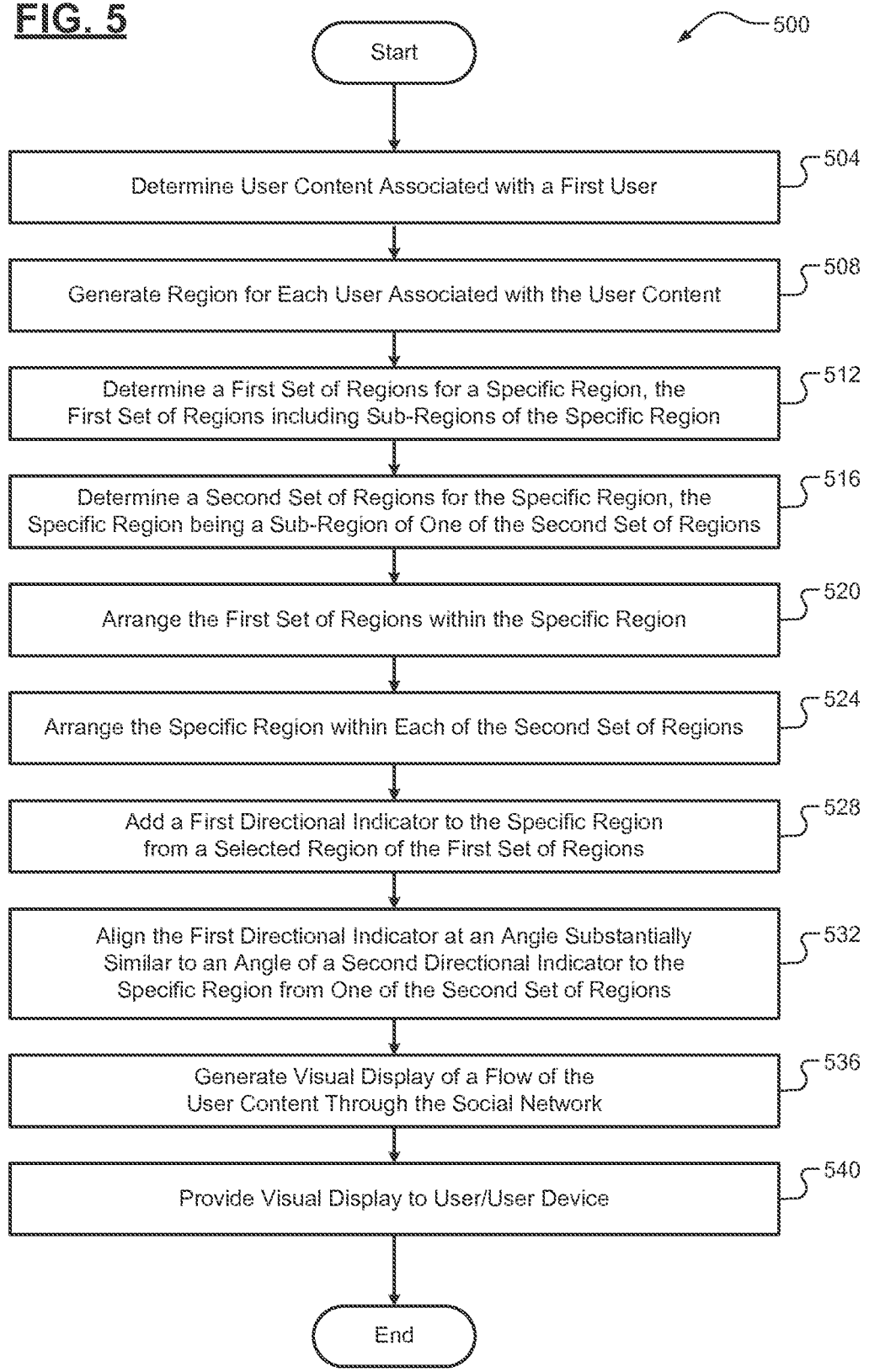

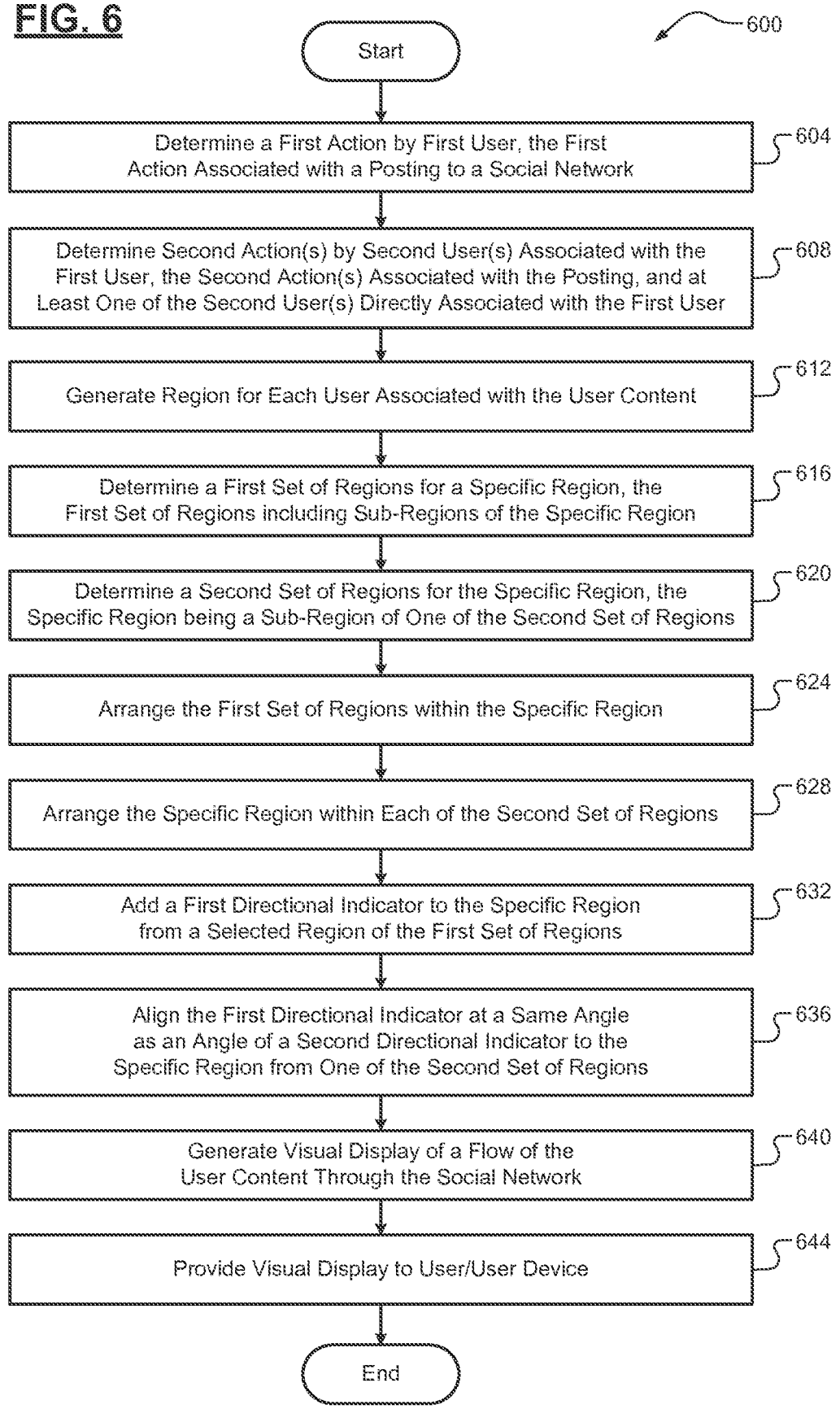

TECHNIQUES FOR GENERATING AND DISPLAYING A VISUAL FLOW OF USER CONTENT THROUGH A SOCIAL NETWORK

CROSS-REFERENCE TO RELATED APPLICATIONS

This application is a continuation of U.S. patent application Ser. No. 13/279,796 filed on Oct. 24, 2011. The entire disclosure of above application is incorporated herein by reference.

FIELD

The present disclosure relates to social networking and, more particularly, to techniques for generating and displaying a visual flow of user content through a social network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Social networks generally refer to websites at which users may interact with other users. For example, a user may access a social network website via a user device connected to a web server via a network, e.g., the Internet. The interaction at a social network may include sharing user content such as photos, videos, and hyperlinks to news stories. The sharing of user content at a social network may also be referred to as a "posting." The interaction at a social network may also include providing commentary on postings. For example, the commentary may include submitting comments or an indication of a user's opinion with respect to a particular posting. In some instances, a posting by a user may be re-posted and/or have commentary provided by other users a plurality of times. The re-posting of and/or commentary to a particular posting may cause the posting to propagate throughout the social network.

SUMMARY

In various embodiments of the present disclosure, a computer-implemented technique for generating and displaying a visual flow of user content through a social network is presented. The computer-implemented technique can include determining, at a computing device having one or more processors and being associated with the social network, a first action by a first user, the first action being associated with a posting to the social network. The technique can further include determining, at the computing device, one or more second actions by one or more second users, respectively, the one or more second actions being associated with the posting, the one or more second users being associated with the first user wherein at least one of the one or more second users is directly associated with the first user. The technique can also include generating, at the computing device, a first instruction for generating a visual display that includes a region for each of the first user and the one or more second users. Additionally, the technique can include generating, at the computing device, a second instruction for arranging the regions in the visual display according to a set of layout rules. The layout rules can include: (i) determining a first set of regions based on a specific region, the first set of regions comprising sub-regions of the specific region, (ii) determining a second set of regions based on the specific region, the specific region being a sub-region of each region of the second set of regions, (iii) arranging each region of the first set of regions to be within the specific region, (iv) arranging the specific region to be within each region of the second set of regions, and (v) adding a first directional indicator from the specific region to a selected region of the first set of regions, the selected region having a larger number of sub-regions than other regions of the first set of regions. The technique can further include generating, at the computing device, a third instruction for aligning the first directional indicator in the visual display at a same angle as an angle of a second directional indicator from one of the second set of regions to the specific region. Furthermore, the technique can include generating, at the computing device, a fourth instruction for providing the visual display to a user via a display connected to the computing device, the visual display illustrating a flow of the user content through the social network and including the regions and the first and second directional indicators.

In various embodiments of the present disclosure, a computer-implemented technique is presented. The technique can include determining, at a computing device having one or more processors and being associated with a social network, a user content associated with a plurality of users. The technique can further include generating, at the computing device, a first instruction for generating a visual display that includes a region for each user of the plurality of users. The technique can also include generating, at the computing device, a second instruction for arranging the regions in the visual display according to a set of layout rules. The layout rules can include: (i) determining a first set of regions based on a specific region, the first set of regions comprising sub-regions of the specific region, (ii) determining a second set of regions based on the specific region, the specific region being a sub-region of each region of the second set of regions, (iii) arranging each region of the first set of regions to be within the specific region, (iv) arranging the specific region to be within each region of the second set of regions, and (v) adding a first directional indicator from the specific region to a selected region of the first set of regions, the selected region having a larger number of sub-regions than other regions of the first set of regions. The technique can further include generating, at the computing device, a third instruction for aligning the first directional indicator in the visual display at an angle substantially similar to an angle of a second directional indicator from one of the second set of regions to the specific region. Additionally, the technique can include generating, at the computing device, a fourth instruction for providing the visual display to a user via a display connected to the computing device, the visual display including the regions and the first and second directional indicators.

In various embodiments of the present disclosure, a system for performing a technique is presented. The system can include a content determination module, a region generation module, a region arrangement module, an alignment module, and a display generation module, all of which present at a computing device having one or more processors and being associated with a social network. The content determination module can determine, at the computing device, a user content associated with a plurality of users. The region generation module can generate, at the computing device, a first instruction for generating a visual display that includes a region for each user of the plurality of users. The region arrangement module can generate, at the computing device, a second instruction for arranging the regions in the visual display according to a set of layout rules. The layout rules can include: (i) determining a first set of regions based on a specific region, the first set of regions comprising sub-regions of the specific region, (ii) determining a second set of regions based on the specific region, the specific region being a sub-region of each of the second set of regions, (iii) arranging each region of the first set of regions to be within the specific region, (iv) arranging the specific region to be within each region of the second set of regions, and (v) adding a first directional indicator from the specific region to a selected region of the first set of regions, the selected region having a larger number of sub-regions than other regions of the first set of regions. The alignment module can generate, at the computing device, a third instruction for aligning the first directional indicator in the visual display at an angle substantially similar to an angle of a second directional indicator from one of the second set of regions to the specific region. The display generation module can generate, at the computing device, a fourth instruction for providing the visual display to a user via a display connected to the computing device, the visual display including the regions and the first and second directional indicators.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a flow diagram of an example technique for generating and displaying a flow of user content through a social network according to some implementations of the present disclosure; and FIG. 6 is a flow diagram of another example technique for generating and displaying a flow of user content through a social network according to some implementations of the present disclosure.

DETAILED DESCRIPTION

Figure 1:
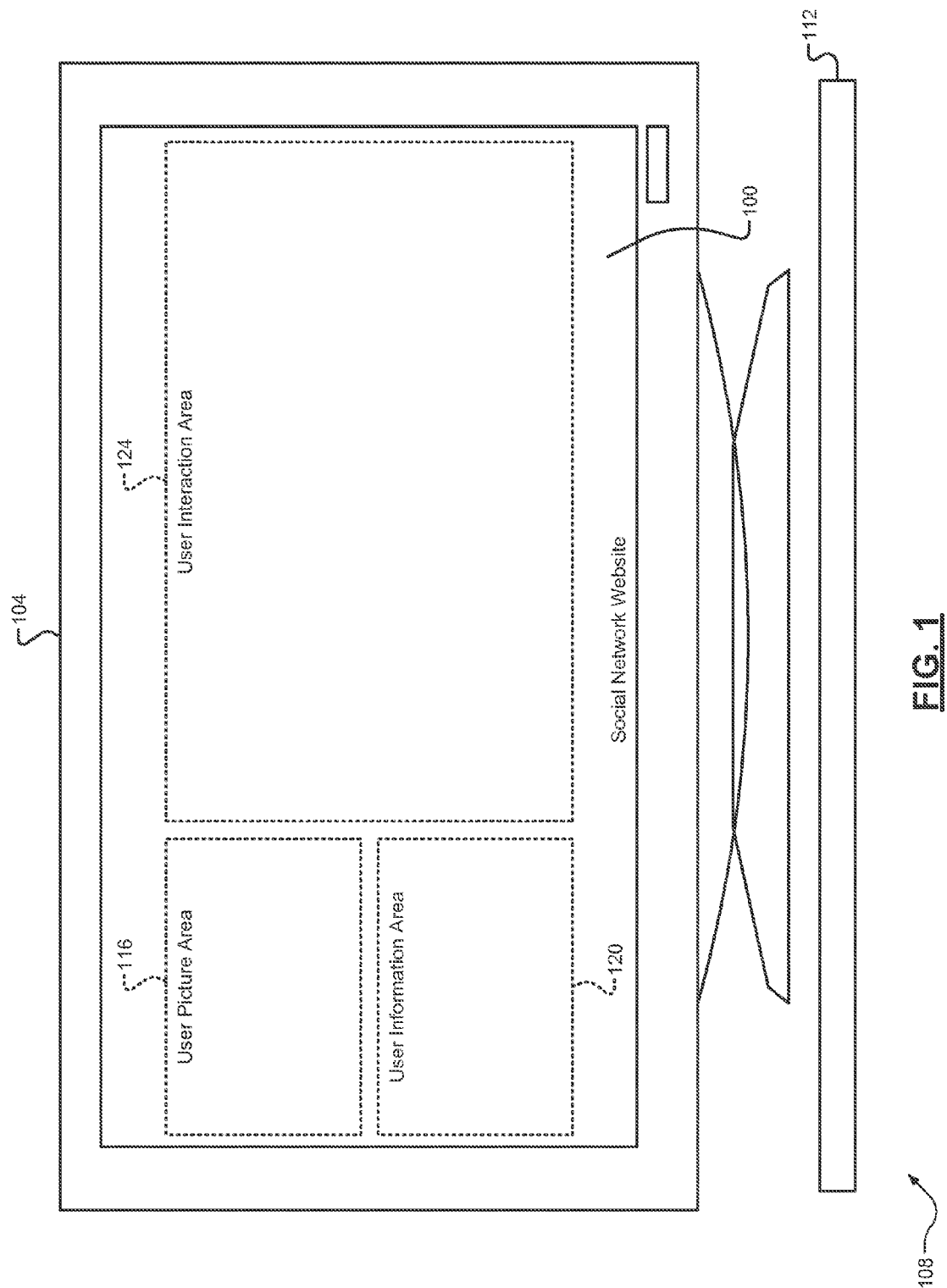
FIG. 1 is a schematic illustration of an example social network website displayed by a user device according to some implementations of the present disclosure.

Referring now to FIG. 1, an example social network website 100 may be displayed via a display 104 of a user device 108. A user (not shown) may interact with the social network website 100 via a user interface 112 of the user device 108. The user's interaction with the social network website 100 may include re-posting and/or providing commentary to other user's postings. The social network website 100 may generally include a user picture area 116, a user information area 120, and a user interaction area 124. It is appreciated that the social network website 100 may also include other suitable areas and/or other suitable configurations. The user picture area 116 may display pictures associated with the user. The user information area 120 may display information about the user, such as age, job, interests, and the like.

The user interaction area 124 may display interaction between the user and other users associated with the social network website 100. For example, the user interaction area 124 may display the postings by the user and/or postings directed to the user by other users. Additionally, for example, the user interaction area 124 may display commentary by the user to other users' postings and/or commentary by other users to the user's postings. As previously mentioned, a posting may be re-posted and/or have commentary provided to it a plurality of times. The posting, therefore, may propagate throughout the social network, e.g., at user interaction areas 124 associated with various different users. For example only, user content that has propagated to more than a particular number of users may be labeled as "viral" user content.

A visual display of a flow of user content through the social network may be generated and displayed to a user to illustrate the path and the reach of the user content, e.g., from an originating user. For example, a tree structure may be generated having nodes that represent all of the various users of the social network that are associated with the user content, e.g., re-posting and/or providing commentary. The various nodes may then be connected with directional indicators, e.g., arrows, to illustrate the flow of the user content from one user to a next user, and so on. As can be appreciated, the visual display of the flow of user content through hundreds or thousands of users of the social network may be very complex and difficult to comprehend. For example, one or more directional indicators may have to intersect. Additionally, the visual display may require a large amount of space, and therefore may require a viewing user to scroll horizontally and/or vertically through the visual display.

Accordingly, techniques are presented for generating and displaying a flow of user content through a social network. The techniques generally provide for a more condensed and more easily understandable visual display of a flow of user content through a social network. The techniques described herein can be implemented by a computing device having one or more processors, for example, a desktop or laptop computer, a server or group of servers, a mobile device such as a mobile phone or tablet, and/or any combination thereof. The use of the term "computing device" herein specifically includes, but is not limited to, the example computing devices described immediately above. Further, it should be appreciated that the techniques, or a portion thereof, can be performed by: (i) generating one or more instructions at a first computing device, and (ii) providing the one or more instructions to a second computing device at which the instructions are executed.

The techniques include determining, at a computing device having one or more processors and being associated with the social network, user content, e.g., a posting, associated with a first user. For example, the first user may have performed an action to the user content such as posting, re-posting, or providing commentary. The techniques include generating, at the computing device, an instruction for generating a visual display that includes a region for each user associated with the user content. For example, the user(s) associated with the user content may include one or more second users that also performed an action to the user content, such as re-posting or providing commentary. The one or more second users may be associated with the first user, with at least one of the one or more second users being directly associated with the first user.

The techniques may further include generating, at the computing device, an instruction for arranging the regions in the visual display according to a set of layout rules. The set of layout rules may include determining a first set of regions based on a specific region, the first set of regions comprising sub-regions of the specific region. The set of layout rules may also include determining a second set of regions based on the specific region, the specific region being one of the sub-regions of the second set of regions. The set of layout rules may further include arranging each region within the first set of regions to be within the specific region. Additionally, the set of layout rules may include arranging the specific region to be within each region of the second set of regions. The set of layout rules may also include adding a first directional indicator from the specific region to a selected region of the first set of regions, the selected region having a larger number of sub-regions than other regions of the first set of regions.

The techniques can also include generating, at the computing device, an instruction for aligning the first directional indicator in the visual display at a substantially similar angle as an angle of a second directional indicator from one of the second set of regions to the specific region. For example only, the substantially similar angle may be within a predetermined number of degrees, e.g., 15 degrees, from the angle of the second directional indicator. It is appreciated that other numbers of degrees may also be implemented. The first directional indicator may also be aligned at a same angle as the angle of the second directional indicator. The techniques can also include generating, at the computing device, an instruction for providing the visual display to a user via a display connected to the computing device. The visual display may illustrate a flow of the user content through the social network and may include the regions and the first and second directional indicators.

Figure 2:
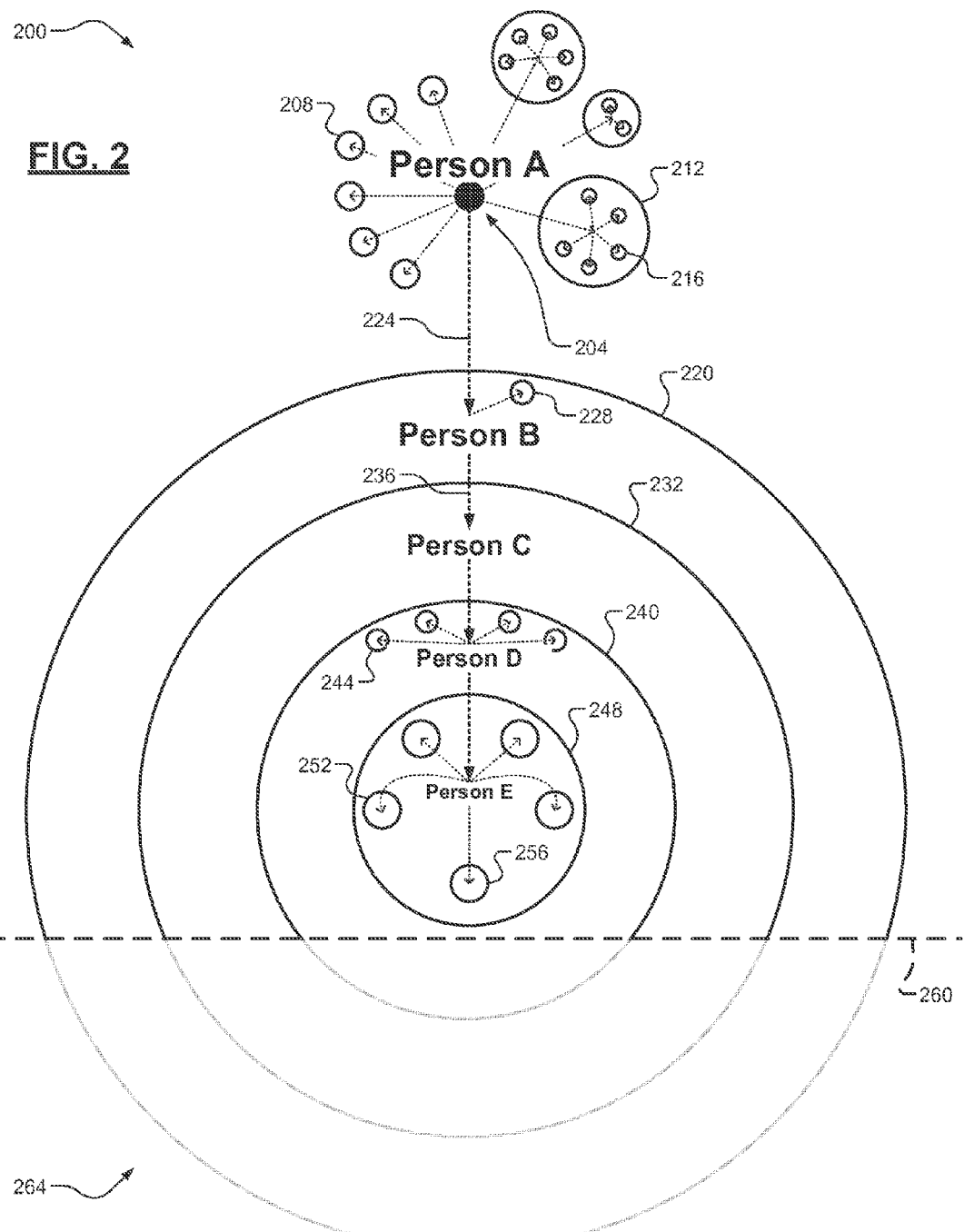
FIG. 2 is an illustration of an example visual display of a flow of user content through a social network according to some implementations of the present disclosure.

Referring now to FIG. 2, an example visual display 200 of a flow of user content through a social network according to some implementations of the present disclosure is illustrated. For example, the visual display 200 may be generated, at a computing device associated with the social network, and then provided, from the computing device, to a user at a user device connected to the computing device, e.g., via a network such as the Internet. The flow of user content is generally presented and described with respect to users associated with the user content. Association with user content may include re-posting the user content and/or providing commentary to the user content. A first user ("Person A") is represented by a region 204. While circular regions are shown and generally described herein, other suitable regular and irregular shapes of regions may be implemented.

Two different types of regions may be associated with Person A: individual regions 208 and group regions 212. The individual regions 208 may represent users associated with Person A, and who are also associated with the user content, e.g., by re-posting or providing commentary. Each of the users represented by the individual regions 208, however, are not associated with additional other users who are also associated with the user content. The group regions 212 may also represent users associated with Person A, and who are also associated with the user content. Each of the users represented by the group regions 212, however, may also be associated with one or more other users (represented by sub-regions 216), who are also associated with the user content and indirectly associated with Person A.

The flow of the user content through the social network may be expressed using directional indicators, e.g., arrows, from region to region. For example, region 204 (Person A) is connected by directional indicators to each of the individual regions 208 and each of the group regions 212. In addition, each of the group regions may include directional indicators from itself to each of its sub-regions, e.g., one of the sub-regions 216. Similarly, region 204 (Person A) may also be connected to region 220 (Person B) by a first directional indicator 224. The first directional indicator 224 may be used in aligning other directional indicators and/or regions, as described more fully below.

When generating the various regions, the size of a particular region may correspond to the number of sub-regions within the particular region. Region 220 may, therefore, be larger than other regions, e.g., one of the sub-regions 216, because region 220 is more populated or more dense than other regions. Specifically, region 220 represents a user ("Person B"), who is directly associated with Person A, and who is also associated with the user content, e.g., by re-posting or providing commentary. The techniques according to some implementations of the present disclosure are directed to aligning the directional indicators and/or the various regions with respect to the first directional indicator 224 from region 204 to region 220 because region 220 includes the most sub-regions and may, therefore, be of greater interest to a user viewing the visual display 200 in order for the user to ascertain details about the flow of the user content through the social network.

The regions may also be arranged according to at least one of a plurality of layout rules or algorithms. For example, the plurality of layout algorithms may include a golden-ratio spiral layout algorithm, an even spacing layout algorithm, and a randomized collision layout algorithm. The golden-ratio spiral layout algorithm may include arranging the regions along a spiral having a center point defined by one of the regions, e.g., region 204. The behavior of the spiral may be defined by a ratio determined by the system or set by the user. A higher ratio may cause the spiral to be wound or "unwind" less tightly compared to a smaller ratio. The even spacing layout algorithm may include arranging each of the regions equidistant from other regions. Lastly, the randomized collision layout algorithm may include arranging each of the regions at a random location within a space of the visual display 200, provided that the random location does not overlap or intersect with another region.

The various layout algorithms may be tested before selecting a final location for each region. Testing may include trying to position each region according to each of the plurality of layout algorithms. In other words, the techniques may attempt to satisfy each of the plurality of layout algorithms. Some of the layout algorithms, however, may be more desirable for arranging than other layout algorithms. The testing, therefore, may include following a priority of the plurality of layout algorithms. For example only, the priority of the plurality of layout algorithms may be as follows: (1) the even spacing layout algorithm, (2) the randomized collision layout algorithm, and (3) the golden-ratio spiral layout algorithm.

After arranging the regions according to one or more of the layout algorithms, the directional indicators and/or the regions may then be aligned. As previously described, the techniques are generally directed to aligning the directional indicators and/or the regions in order to simply conceptualize the flow of the user content through the social network for a viewing user. In other words, the directional indicators and/or the regions may be generally aligned in a direction corresponding to most activity of the user content, e.g., with respect to the first directional indicator 224. As previously described, region 220 includes more sub-regions than other regions, which represents activity relating to the user content, e.g., re-posting or providing commentary.

As shown, the first directional indicator 224 from region 204 (Person A) to region 220 (Person B) is generally in a downward direction. Region 220 includes a first sub-region 228 and a second sub-region 232 (hereinafter "region 232"). The region 232 is more populated than the first sub-region 228, and therefore alignment of the directional indicators and/or regions continues with region 232. More specifically, a second directional indicator 236, which connects region 220 to region 232, is aligned with respect to the first directional indicator 224. While region 232 is shown to be aligned within a center of region 220, region 232 may also be offset, e.g., either downwards or to the left or right. When the region 232 is offset, however, the second directional indicator 236 may still be aligned with the first directional indicator 224.

Region 232 represents another user ("Person C"). As illustrated, regions 204, 220, and 232 may be labeled with text indicating a name of the user represented by the region (Person A, Person B, and Person C, respectively). These regions may be labeled because they are more populated regions within the visual display 200. In some embodiments, the size of the text labels may depend on the number of sub-regions of the region (or the size of the region). For example, the text for Person B may be larger than the text for Person C because region 220 is larger than region 232, and so on.

Region 232 includes one-sub region: region 240, which represents another user, Person D. Region 240 includes a plurality of sub-regions 244 in addition to a large group sub-region 248 (hereinafter "region 248"). Person D, therefore, may be a famous or well-connected person, such as a celebrity. Region 248 represents another user, Person E. Region 248 also includes a plurality of sub-regions 252. One of the plurality of sub-regions 252 (referenced as sub-region 256), may also be aligned with the other directional indicators and/or regions. The resulting visual display 200 is generally aligned downwards from region 204 (Person A) towards region 220 (Person B) continuing to an endpoint at region 248 (Person E), or alternatively sub-region 256 of region 248.

In addition, a portion of the visual display 200 may be cropped to decrease the overall size of the visual display 200. For example only, the visual display 200 may be cropped along line 260 thereby removing a portion 264 of the visual display 200. The resulting visual display 200 above line 260 may be increased in size, e.g., on a display of a user device, thereby making the visual display 200 easier for a user to understand. Additionally or alternatively, the directional indicators may be straight or curved. For example, curved directional indicators, e.g., one of the directional indicators to one of the sub-regions 252, may be used to decrease space required for the visual display 200.

Figure 3:
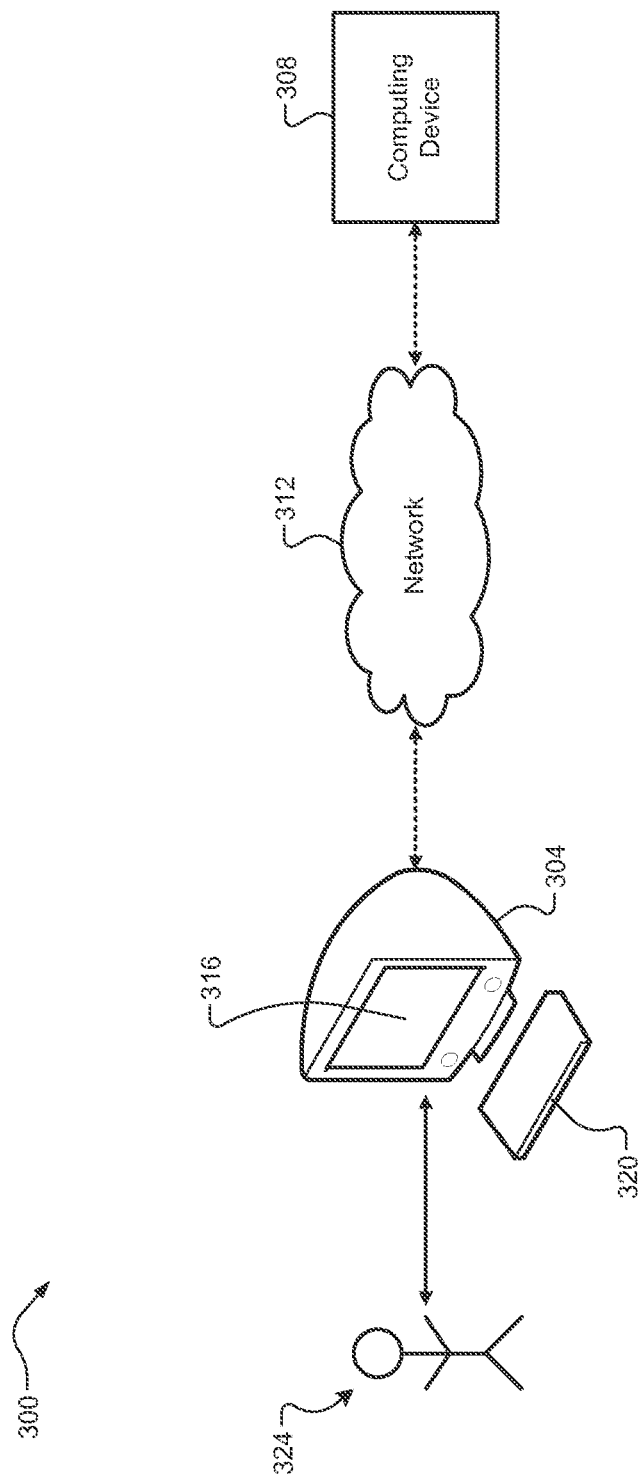
FIG. 3 is a schematic illustration of an example network system according to some implementations of the present disclosure.

Referring now to FIG. 3, an example system 300 includes a user device 304 connected to a computing device 308 via a network 312. The user device 304 may be any suitable computing device configured for browsing a social network website via the network 312. For example, the user device 304 may be a desktop computer, a laptop computer, a tablet computer, or a mobile phone. The network 312 may be a suitable network such as the Internet. The user device 304 may generally include a display 316, a user interface 320, and a processor (not shown). The user device 304 may provide information, e.g., the social network website, to a user 324 via the display 316. The user device 304 may also receive input from the user 324 via the user interface 320, e.g., a keyboard and/or mouse.

The computing device 308 may be any suitable computing device configured to provide the social network website to the user 324 via the user device 304. It is appreciated that more than one computing device 308 may be implemented to provide the social network website to the user 324, e.g., via distributed servers. The computing device 308 may also implement the techniques according to some implementations of the present disclosure. More specifically, the computing device 308 may provide a visual display 200 of user content through the social network to the user 324 via the user device 304, e.g., when requested by the user 324. Furthermore, in some implementations the user device 304 may generate the visual display 200 based on data received from the computing device 308. For example only, a web browser executing on the user device 304 may implement the described techniques based on data and/or instructions provided from the computing device 308.

Figure 4:
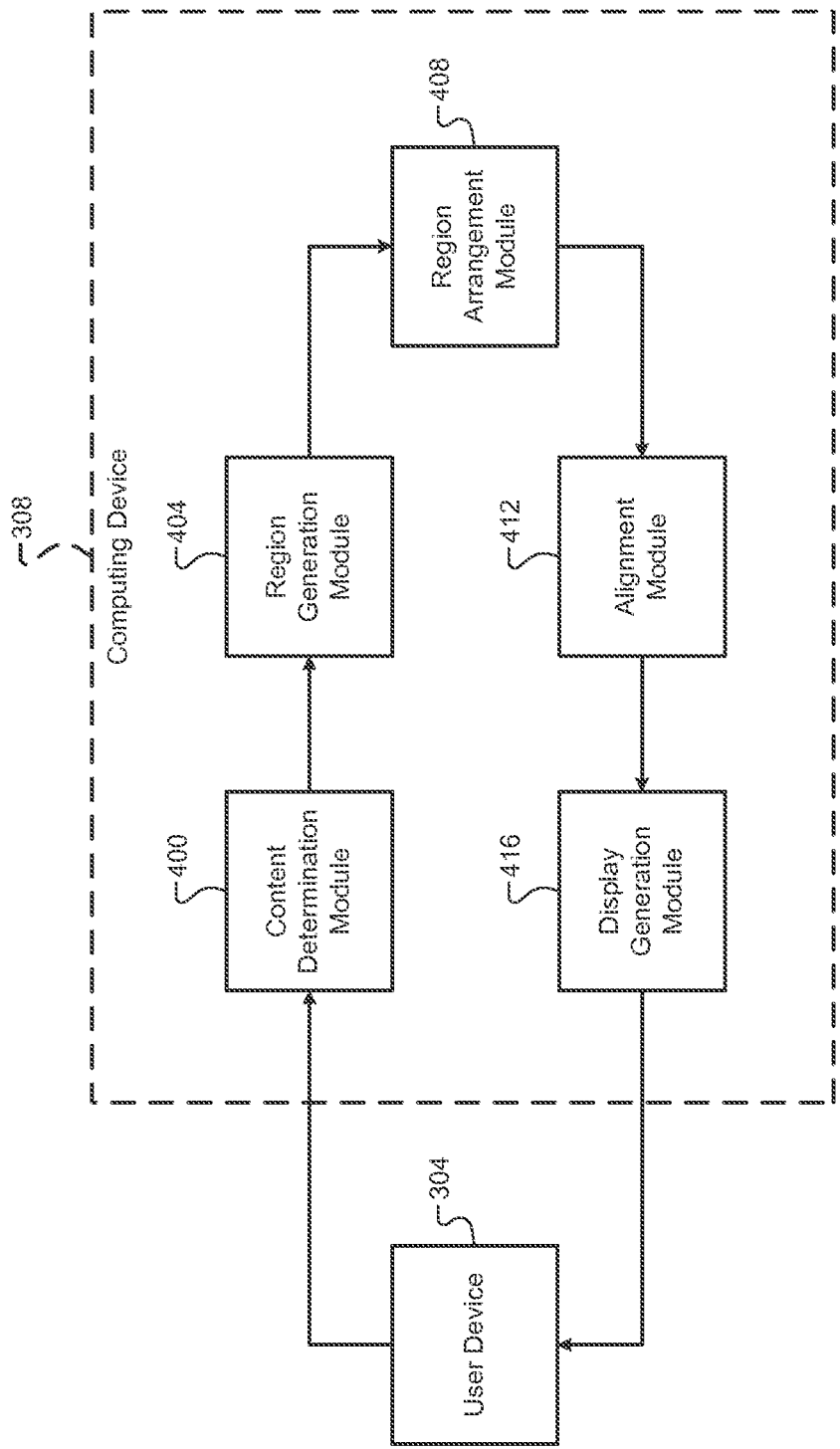
FIG. 4 is a functional block diagram of an example computing device of the network system of FIG. 3 according to some implementations of the present disclosure.

Referring now to FIG. 4, an example of the computing device 308 is shown. The computing device 308 may include a content determination module 400, a region generation module 404, a region arrangement module 408, an alignment module 412, and a display generation module 416. It is appreciated that the computing device 308 may also include other suitable components, such as one or more processors, memory and the like.

The content determination module 400 determines user content associated with a first user of the social network. The particular user content may be selected by the user 324. For example, the user 324 may input a starting point, e.g., a hyperlink, to track a flow of user content through the social network. For illustrative purposes, the first user may be Person A, represented by region 204 (see FIG. 2). The content determination module 400 may also determine other users associated with the user content. For example, the other users may include one or more second users associated with both the first user and the user content. At least one of the one or more second users may be directly associated with the first user. The region generation module 404 may then generate a region for each user associated with the user content. For example, the regions may be circular-shaped regions such as those in FIG. 2. Other regular and irregular shaped regions may also be used.

The region arrangement module 408 may then arrange the regions within a display space according to a set of layout rules. The set of layout rules may include determining a first set of regions based on a specific region, the first set of regions comprising sub-regions of the specific region. The set of layout rules can further include determining a second set of regions based on the specific region, the specific region being one of the sub-regions of the second set of regions. The set of layout rules can further include arranging each region of the first set of regions to be within the specific region. Further, the set of layout rules may include arranging the specific region to be within each region of the second set of regions. The set of layout rules may additionally include adding a first directional indicator from the specific region to a selected region of the first set of regions, the selected region having a larger number of sub-regions than other regions of the first set of regions.

The region arrangement module 408 may also arrange the regions according to at least one of a plurality of layout algorithms. For example, the plurality of layout algorithms may include the golden-ratio spiral layout algorithm, the even spacing layout algorithm, and the randomized collision layout algorithm (all previously described herein). Other layout algorithms may alternatively or additionally be used. As previously described, a priority of the layout algorithms may be used during testing of the various layout algorithms. For example, the priority may be as follows: (1) the even spacing layout algorithm, (2) the randomized collision layout algorithm, and (3) the golden-ratio spiral layout algorithm.

The alignment module 412 may then align directional indicators and/or regions. For example, the alignment module 412 may align a directional indicator, e.g., the second directional indicator 236 from region 220 to region 232, at a substantially similar angle as the angle of the directional indicator from one of the second set of regions to the specific region, e.g., the first directional indicator 224 from region 204 to region 220. For example only, the substantially similar angle may be within a predetermined number of degrees, e.g., 15 degrees, from the angle of the second directional indicator. It is appreciated that other numbers of degrees may also be implemented. The first directional indicator may also be aligned at the same or similar angle as the angle of the second directional indicator.

The display generation module 416 may then generate a visual display 200 of a flow of the user content through the social network, the visual display 200 including the regions and directional indicators (after arranging and aligning). For illustrative purposes only, the display generation module 416 may generate the visual display 200 of FIG. 2, which includes directional indicators and regions aligned with the first directional indicator 224 in a downward direction from region 204 towards region 220 (and further down to regions 248/256). The display generation module 416 may then provide the visual display to the user 324 via the display 316 of the user device 304 connected to the computing device 308 via the network 312. For example, the display generation module 416 (or a separate module) may transmit the visual display via the network 312.

Referring now to FIG. 5, an example technique 500 for generating and displaying a flow of user content through a social network is illustrated. At 504, the content determination module 400 determines user content associated with a first user. At 508, the region generation module 404 generates a region for each user associated with the user content. The region arrangement module 408 may then begin arranging the regions according to a set of layout rules (see 512 through 528, described in detail below).

At 512, the region arrangement module 408 can determine a first set of regions based on a specific region, the first set of regions comprising sub-regions of the specific region. At 516, the region arrangement module 408 may determine a second set of regions based on the specific region, the specific region being one of the sub-regions of the second set of regions. At 520, the region arrangement module 408 can arrange each region within the first set of regions to be within the specific region. At 524, the region arrangement module 408 can arrange the specific region to be within each region of the second set of regions. At 528, the region arrangement module 408 may add a first directional indicator from the specific region to a selected region of the first set of regions, the selected region having a larger number of sub-regions than other regions of the first set of regions. The actions described by 512-528 may be performed for all regions, i.e., actions 512-528 may repeat by assigning each region as the specific region and performing the same actions.

At 532, the alignment module 412 can align the first directional indicator at an angle substantially similar to an angle of a second directional indicator from one of the second set of regions to the specific region. At 536, the display generation module 416 generates a visual display of a flow of the user content through the social network, the visual display including the regions and the first and second directional indicators. At 540, the computing device 308, e.g., the display generation module 416, can provide the visual display to the user 324 via the display 316 of the user device 304 connected to the computing device 308, e.g., via the network 312. Control may then end or return to 504 for one or more additional cycles.

Referring now to FIG. 6, an example technique 600 for generating and displaying a flow of user content through a social network is illustrated. At 604, the content determination module 400 can determine a first action by a first user, the first action being associated with a posting to the social network. At 608, the content determination module 400 can determine one or more second actions by one or more second users, respectively. The one or more second actions may be associated with the posting and the first user, wherein at least one of the one or more second users is directly associated with the first user. At 612, the region generation module 404 may generate a region for each of the first user and the one or more second users. The region arrangement module 408 can then begin arranging the regions according to a set of layout rules (see 616 through 632, described in detail below).

At 616, the region arrangement module 408 can determine a first set of regions based on a specific region, the first set of regions comprising sub-regions of the specific region. At 620, the region arrangement module 408 can determine a second set of regions based on the specific region, the specific region being one of the sub-regions of the second set of regions. At 624, the region arrangement module 408 may arrange each region within the first set of regions to be within the specific region. At 628, the region arrangement module 408 may arrange the specific region to be within each region of the second set of regions. At 632, the region arrangement module 408 adds a first directional indicator from the specific region to a selected region of the first set of regions, the selected region having a larger number of sub-regions than other regions of the first set of regions. The region arrangement module 408 may apply the set of layout rules to arrange all regions. That is, the set of layout rules may be applied for each region as if it were the specific region described.

At 636, the alignment module 412 may align the first directional indicator at a same or similar angle as an angle of a second directional indicator from one of the second set of regions to the specific region. At 640, the display generation module 416 generate a visual display 200 of a flow of the user content through the social network, the visual display 200 including the regions and the first and second directional indicators. At 644, the computing device 308, e.g., the display generation module 416, can provide the visual display 200 to the user 324 via the display 316 of the user device 304 connected to the computing device 308, e.g., via the network 312. Control may then end or return to 604 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    determining, at a computing device having one or more processors and being associated with a social network, a user content associated with a plurality of users;
    generating, at the computing device, a first instruction for generating a visual display that includes a region for each user of the plurality of users;
    generating, at the computing device, a second instruction for arranging the regions and one or more directional indicators in the visual display according to a set of layout rules such that the regions and the one or more directional indicators illustrate a flow of the user content through the social network, wherein the layout rules include:
        determining a first set of regions based on a specific region, the first set of regions comprising sub-regions of the specific region, and
        arranging each region of the first set of regions to be within the specific region; and
    generating, at the computing device, a third instruction for providing the visual display to a user via a display associated with the computing device, the visual display including the regions and the one or more directional indicators.

2. The computer-implemented method of claim 1, wherein the layout rules further include:
    determining a second set of regions based on the specific region, the specific region being a sub-region of each region of the second set of regions; and
    arranging the specific region to be within each region of the second set of regions.

3. The computer-implemented method of claim 2, wherein a size of each of the regions depends on a number of sub-regions of that region, and wherein the size of the region increases as the number of sub-regions in the region increases.

4. The computer-implemented method of claim 3, further comprising generating, at the computing device, a fourth instruction for adding text to one or more of the regions, the text indicating a name of a user associated with the one or more of the regions, a size of the text being based on the size of the one or more of the regions associated with the text.

5. The computer-implemented method of claim 2, wherein the layout rules include adding a first directional indicator from the specific region to a selected region of the first set of regions, the selected region having a larger number of sub-regions than other regions of the first set of regions.

6. The computer-implemented method of claim 5, further comprising generating, at the computing device, a fourth instruction for aligning the first directional indicator in the visual display at an angle substantially similar to an angle of a second directional indicator from one of the second set of regions to the specific region.

7. The computer-implemented method of claim 6, further comprising generating, at the computing device, a fifth instruction for aligning each region associated with the first and second directional indicators.

8. The computer-implemented method of claim 1, wherein arranging the regions according to the set of layout rules further includes selecting, at the computing device, a layout algorithm to use in arranging the regions, the layout algorithm being one of a golden-ratio spiral layout algorithm, an even spacing layout algorithm, and a randomized collision layout algorithm.

9. The computer-implemented method of claim 1, wherein the user content is a posting to a website representing the social network, and wherein each user has either re-posted the user content or provided commentary to the user content.

10. A computing device associated with a social network and having one or more processors configured to perform operations comprising:
    determining a user content associated with a plurality of users;
    generating a first instruction for generating a visual display that includes a region for each user of the plurality of users;
    generating a second instruction for arranging the regions and one or more directional indicators in the visual display according to a set of layout rules such that the regions and the one or more directional indicators illustrate a flow of the user content through the social network, wherein the layout rules include:
        determining a first set of regions based on a specific region, the first set of regions comprising sub-regions of the specific region; and
        arranging each region of the first set of regions to be within the specific region; and
    generating a third instruction for providing the visual display to a user via a display associated with the computing device, the visual display including the regions and the one or more directional indicators.

11. The computing device of claim 10, wherein the layout rules further include:
    determining a second set of regions based on the specific region, the specific region being a sub-region of each region of the second set of regions; and
    arranging the specific region to be within each region of the second set of regions.

12. The computing device of claim 11, wherein a size of each of the regions depends on a number of sub-regions of that region, and wherein the size of the region increases as the number of sub-regions in the region increases.

13. The computing device of claim 12, wherein the operations further comprise generating a fourth instruction for adding text to one or more of the regions, the text indicating a name of a user associated with the one or more of the regions, a size of the text being based on the size of the one or more of the regions associated with the text.

14. The computing device of claim 11, wherein the layout rules include adding a first directional indicator from the specific region to a selected region of the first set of regions, the selected region having a larger number of sub-regions than other regions of the first set of regions.

15. The computing device of claim 14, wherein the operations further comprise generating a fourth instruction for aligning the first directional indicator in the visual display at an angle substantially similar to an angle of a second directional indicator from one of the second set of regions to the specific region.

16. The computing device of claim 15, wherein the operations further comprise generating a fifth instruction for aligning each region associated with the first and second directional indicators.

17. The computing device of claim 10, wherein arranging the regions according to the set of layout rules further includes selecting a layout algorithm to use in arranging the regions, the layout algorithm being one of a golden-ratio spiral layout algorithm, an even spacing layout algorithm, and a randomized collision layout algorithm.

18. The computing device of claim 10, wherein the user content is a posting to a website representing the social network, and wherein each user has either re-posted the user content or provided commentary to the user content.

19. A computer-implemented method, comprising:
determining, at a computing device having one or more processors and being associated with a social network, a user content associated with a plurality of users;
generating, at the computing device, a first instruction for generating a visual display that includes a region for each user of the plurality of users;
generating, at the computing device, a second instruction for arranging the regions and one or more directional indicators in the visual display according to a set of layout rules such that the regions and the one or more directional indicators illustrate a flow of the user content through the social network, wherein the second instruction specifies a layout algorithm to use in arranging the regions, the layout algorithm being one of (i) a golden-ratio spiral layout algorithm, (ii) an even spacing layout algorithm, and (iii) a randomized collision layout algorithm; and
generating, at the computing device, a third instruction for providing the visual display to a user via a display associated with the computing device, the visual display including the regions and the one or more directional indicators.

\* \* \* \* \*